US005409752A

United States Patent [19]

Juteau

[11] Patent Number: 5,409,752

[45] Date of Patent: Apr. 25, 1995

[54] SET OF ENVELOPES CONSISTING OF A WEB THE FRONT AND BACK SURFACES OF WHICH BEAR AREAS OF ADHESIVE

[76] Inventor: Olivier D. Juteau, 13, Impasse Emile Rachebourg, Bouqival, France

[21] Appl. No.: 108,812

[22] Filed: Aug. 19, 1993

[30] Foreign Application Priority Data

Sep. 2, 1992 [FR] France ............ 92 10478

[51] Int. Cl.[6] ............ B32B 3/10; B42D 15/08

[52] U.S. Cl. ............ 428/40; 229/75; 428/43; 428/131; 428/194; 428/195; 428/201; 428/202; 428/220; 428/343; 428/906; 462/2; 462/900

[58] Field of Search ............ 428/40, 195, 43, 194, 428/201, 202, 906, 220, 131, 343; 229/75; 462/2, 900

[56] References Cited

U.S. PATENT DOCUMENTS

| | | | |
|---|---|---|---|
| 2,105,448 | 1/1938 | Brenn | 462/2 |
| 2,926,025 | 2/1960 | Sornberger | 282/22 |
| 3,203,823 | 8/1965 | Grimes | 428/354 |
| 3,916,051 | 10/1975 | Wakeman | 428/202 |
| 4,097,619 | 6/1978 | Davis et al. | 427/44 |
| 4,217,162 | 8/1980 | Glanz et al. | 156/305 |
| 4,230,514 | 10/1980 | Becker et al. | 156/305 |
| 4,320,868 | 3/1982 | Petersson | 229/75 |
| 4,611,826 | 9/1986 | Breen | 282/8 R |
| 4,730,847 | 3/1988 | Donnelly | 282/1 R |
| 4,768,810 | 9/1988 | Mertens | 428/202 |
| 4,912,080 | 3/1990 | Weinstein | 503/200 |
| 4,925,213 | 5/1990 | Anderson | 282/124 |
| 4,938,505 | 7/1990 | Gruttemeyer et al. | 282/12 R |

FOREIGN PATENT DOCUMENTS

| | | | |
|---|---|---|---|
| 285514 | 5/1988 | European Pat. Off. . | |
| 1215307 | 4/1960 | France . | |
| 2308510 | 11/1976 | France . | |
| 2431919 | 3/1980 | France | 229/75 |
| 2668979 | 5/1992 | France . | |
| 2745624 | 4/1979 | Germany . | |
| 58-208097 | 12/1983 | Japan . | |
| 1594798 | 8/1981 | United Kingdom . | |
| 2143204 | 2/1985 | United Kingdom . | |

*Primary Examiner*—Nasser Ahmad
*Attorney, Agent, or Firm*—Nixon & Vanderhye

[57] ABSTRACT

In a web of envelope lengths rolled for storage, adhesives on the web are arranged to not overlap during storage. To prevent the areas of adhesive of the front surface on one turn from binding to the areas of adhesive on the back surface of an adjacent turn in the roll, the transverse lines of adhesion are formed of adhesive spots, and the adhesives on the front surface are contained in first longitudinal zones and the adhesives on the back surface are contained in second longitudinal zones separate from the adhesives on the front surface. This disposition may be a combined arrangement of adhesives which also prevents adhesion when the web assembly is folded in zigzag packet configuration for storage.

9 Claims, 3 Drawing Sheets

SET OF ENVELOPES CONSISTING OF A WEB THE FRONT AND BACK SURFACES OF WHICH BEAR AREAS OF ADHESIVE

FIELD OF THE INVENTION

The present invention relates to a set of envelopes presented as a web. The web is designed to be cut along transverse lines into individual envelope lengths.

BACKGROUND AND SUMMARY OF THE INVENTION

It is known to form "Z-folding" envelopes from a web in which each envelope length in the web is divided into three substantially equal parts by two fold lines. These parts are defined arbitrarily as the anterior, central and posterior parts of the envelope. On the web surfaces may be printed information on the anterior, central and posterior parts of each envelope length. For example, address information may be printed on the anterior part of the envelope.

After the web is cut, each envelope length is Z-folded such that the printed surfaces of the central and the posterior parts are in face-to-face contact. The anterior part is folded over the central part in an opposite direction to the posterior part such that the non-printed surfaces of the posterior and central parts are in face-to-face contact.

The Z-folded envelope is sealed together with adhesives applied to the web surfaces. The contacting surfaces of the envelope parts have adhesives arranged along transverse and longitudinal lines. For example, these adhesives are positioned on the printed surfaces of the posterior and central parts, and on the non-printed surface of the anterior and central parts of the envelope length. The envelope webs may be delivered and stored either as a web roll or packets of a web folded in a zigzag configuration along the transverse cutting lines of the envelope lengths. When the web is folded and stored in a zigzag pattern, the printed envelope surfaces (or surfaces to receive printing) of two successive envelope lengths are folded so as to be face-to-face and, alternatively, the non-printed surfaces of two other envelope lengths are folded into face-to-face contact. Thus, each surface of an envelope length with its associated adhesive strips is face-to-face with its counter-part surface of an adjacent envelope length.

French Patent Application FR-A-2,431,964, describes a process for preventing the adhesive strips on the envelope lengths from adhering to the adhesive facing strips on adjacent envelope lengths during storage of web packets. This process consists of transversely offsetting parts of each longitudinal adhesion line with respect to another part of the same line on an adjacent envelope surface. However, in the process described in FR-A-2,431,964, the transverse lines of adhesives on the envelope lengths are not modified.

Web rolls of envelopes also have problems with adhesive strips bonding together during storage. However, the problem in a roll manifests itself differently than in a folded web packet, because in a roll the printed surface on one envelope comes into contact with the opposite surface of another envelope in the web. In a web roll, the relative orientation of the lines of adhesive on adjacent turns of the web roll varies from one turn of the roll to another. Accordingly, the process described in FR-A-2,431,964 is not applicable to web rolls.

It is the aim of the present invention to solve the problem of bonding between adhesive strips that come into contact during storage of a web of Z-folding envelope lengths. The present invention is intended to be applicable to web rolls and folded web packets.

The invention provides a web of envelope lengths each having front and back surfaces. The web may be cut into individual envelope lengths where each envelope may have two adhesive longitudinal edge strips and transverse adhesive strip(s) on the front and back surfaces of the web. The adhesive strips have the following features: (1) all of the transverse adhesion lines are constituted by adhesion spots spaced apart from one another, and (2) the areas of adhesive of the front web surface are contained in a first longitudinal zone of the web, and the areas of adhesive on the back surface are contained in a second longitudinal zone of the web, the first longitudinal zone(s) being outside the second longitudinal zone(s) and vice versa.

Since the areas of adhesive on one surface of the envelope lengths are in a different longitudinal zone(s) from the longitudinal zone(s) which contains the areas of adhesive of the opposite surface, the adhesive areas do not overlap when the web is in a roll. Thus, there is no bonding between adjacent adhesive areas during storage of the web roll. Similarly, when the web is folded into a packet and individual envelope lengths are folded front surface against front surface and back surface against back surface, it is possible to avoid overlapping adhesive areas by segregating the areas of adhesive appropriately in the separate longitudinal zones described above.

In the present invention, the longitudinal adhesive zones of the front surface and the longitudinal adhesive zones of the back surface may be adjacent or separated by neutral zones which have no adhesive on the front or back zone surfaces. Usually, edges of the web will constitute neutral zones as they may possibly contain drive perforations for a tractor web feeder.

BRIEF DESCRIPTION OF THE DRAWINGS

The invention will now be explained in greater detail with reference to the drawings identified as follows.

DETAILED DESCRIPTION OF THE DRAWINGS

Figure 1:
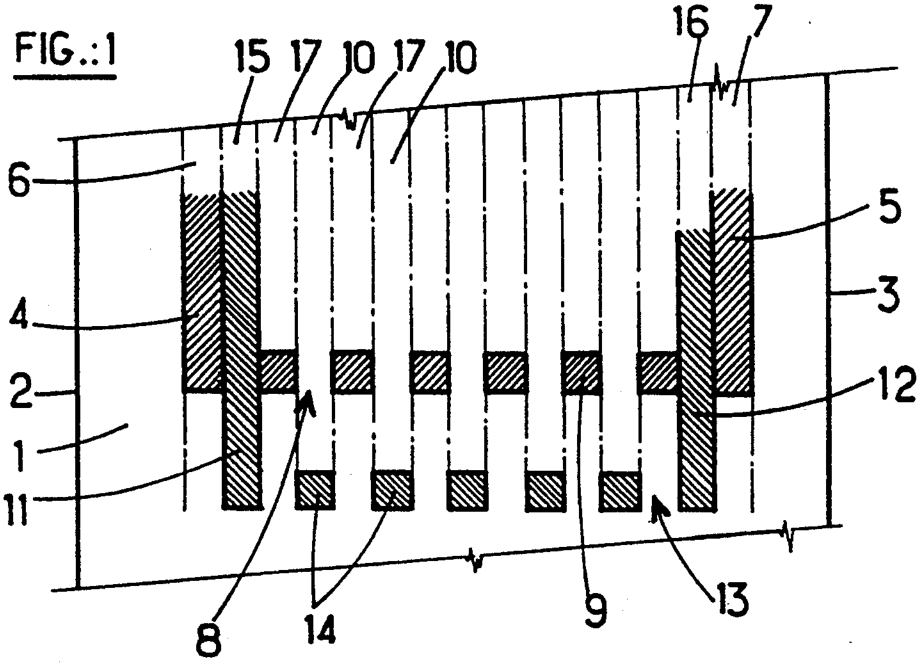
FIG. 1 is a diagrammatic view of an envelope length and shows a disposition of adhesion areas according to the invention.

FIG. 1 shows a web 1 having various areas coated with adhesive that are marked by hatching in that figure. For example, the adhesive areas shown as being on the front surface of the web are hatched in a downwardly sloped to the left orientation that is different than the downwardly sloped to the right hatch orientation that shows the adhesive areas on the back surface of the web. The areas having adhesion on the front and back of the web are shown superimposed in FIG. 1. The left and right edges of the web are designated by the reference numerals 2 and 3. The symmetrically disposed areas of adhesion areas on the front surface of the web include two longitudinal adhesion lines 4, 5 which each occupy a respective longitudinal zone 6, 7. The front web surface also may include a transverse adhesion line 8 formed of identical adhesion spots 9, transversely spaced in separate longitudinal zones 10.

Similarly, the back surface of the web 1 includes two longitudinal adhesion lines 11, 12 and one transverse adhesion area 13. The transverse area 13 may be formed of adhesion spots 14 similar to those spots 9 on the front surface. The back surface adhesion zones 15, 16, 17 occupied by the longitudinal adhesion lines 11, 12 and the adhesion spots 14 alternate and do not overlap with the adhesive zones 6, 7, 10 on the front surface of the web 1.

In the particular embodiment shown in FIG. 1, the various longitudinal zones are shown as being adjacent to each other, without an interposed adhesive-free neutral zone. It will be understood that the adhesive areas on the front surface will not bond to the adhesive areas on the back surface when the web is rolled because the adhesive zones 6, 7, 8 on the front web surface do not overlap with the adhesive zones 15, 16, 17 on the back surface when the web is rolled.

Figure 2:
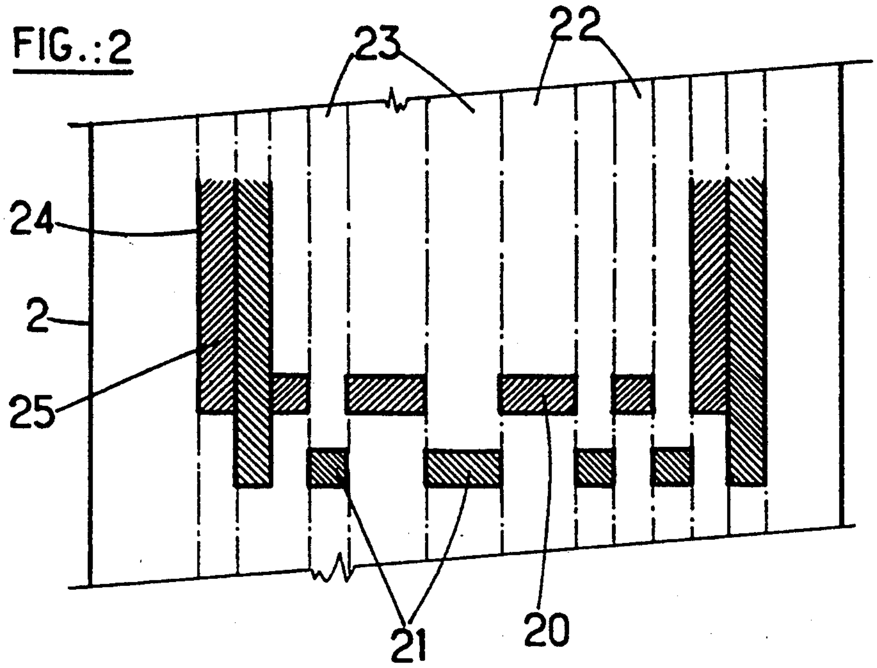
FIGS. 2 to 5 are similar to the view shown in FIG. 1, but show variant embodiments of the invention.

FIG. 2 shows a second embodiment that differs from the embodiment shown in FIG. 1 in that the adhesive spots 20 on the front web surface and the adhesive spots 21 on the back web surface are wider in the central part of the web than near the edges of the web. By this arrangement of spots, it is possible to obtain a greater resistance to tearing at the corners of the folded envelope. In this arrangement, the width of the longitudinal zones 22, 23 containing the areas of adhesive 20, 21 increase from the zones at the web edges to the zones at the center of the web. Nevertheless, the longitudinal zones corresponding to the areas of adhesive on one web surface do not overlap with the zones on the opposite web surface so that no bonding occurs between adhesives during web storage. In addition, the left-hand side of the longitudinal adhesive strip 24 on the front web surface is closer to the edge 2 than is the corresponding adhesive strip 25 on the back surface. This offset orientation of longitudinal strips is reversed on the right-hand side of the web.

Figure 3:
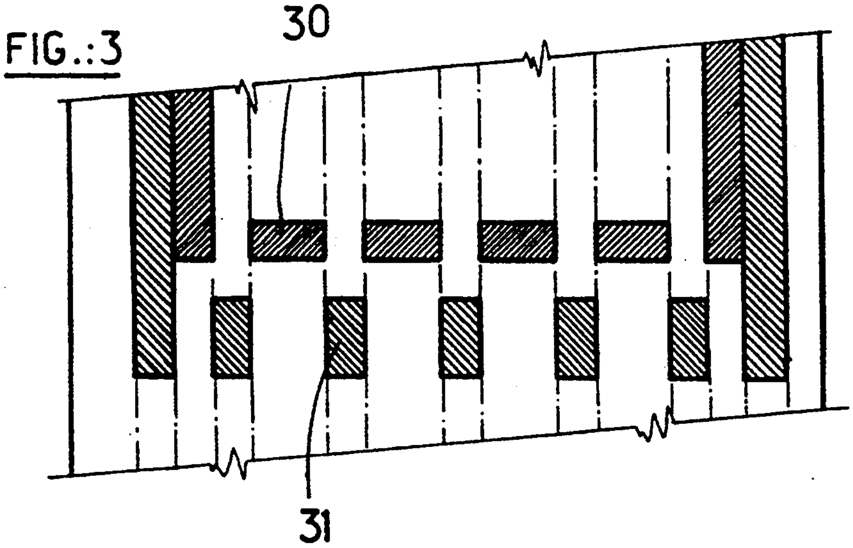

As shown in FIG. 3, the adhesive spots 30 provided on the front web surface are transversely elongate, whereas the adhesive spots 31 on the back web surface are longitudinally elongate. Varying the shape of the adhesive spots on one web surface from those on the opposite surface may be desirable in certain circumstances. For example, in a Z-folding envelope the line of adhesive spots on one web surface may be used to ensure the confidentiality of the mailed correspondence, whereas the line of adhesive spots on the opposite surface may prevent the loss of the address information. The different purposes to which the web surfaces are applied may impose different requirements on the adhesive lines on each web surface that may lead to different shapes of the adhesion spots on each surface.

Figure 4:
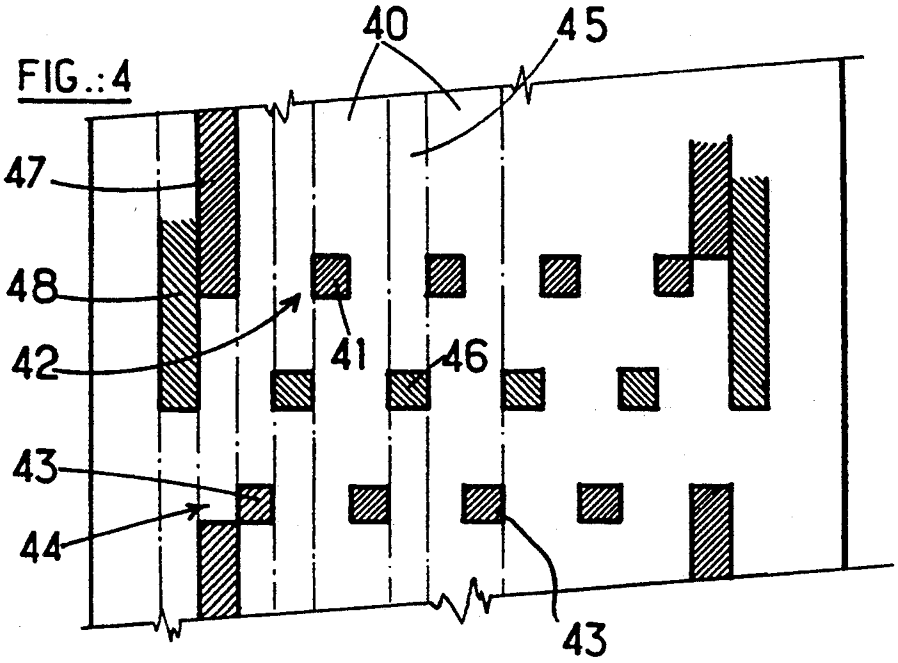

In FIG. 4, the longitudinal zones 40 of the front web surface contain adhesion spots 41 which form part of a first transverse line 42. Adhesion spots 43 are also in the zone 40 and form part of a second transverse line 44. These spots 43, 41 are offset transversely with respect to one another so that they cannot adhere to one another in a web packet folded in a zigzag configuration. The adhesion spots 41 and 43 are contained in longitudinal zones 40 which are different from the longitudinal zones 45 which contain the adhesion spots 46 of the back surface. Accordingly, adhesion between face-to-face adhesion spots is impossible when the web is in a roll and in a packet.

An offset similar to that of the adhesion spots 41, 43 can equally be produced on the longitudinal lines 47, 48 in the manner described in the above-mentioned document FR-A-2,431,964, without falling outside the invention, provided that the rules which have been set forth above relating to the longitudinal zones are satisfied.

Figure 5:
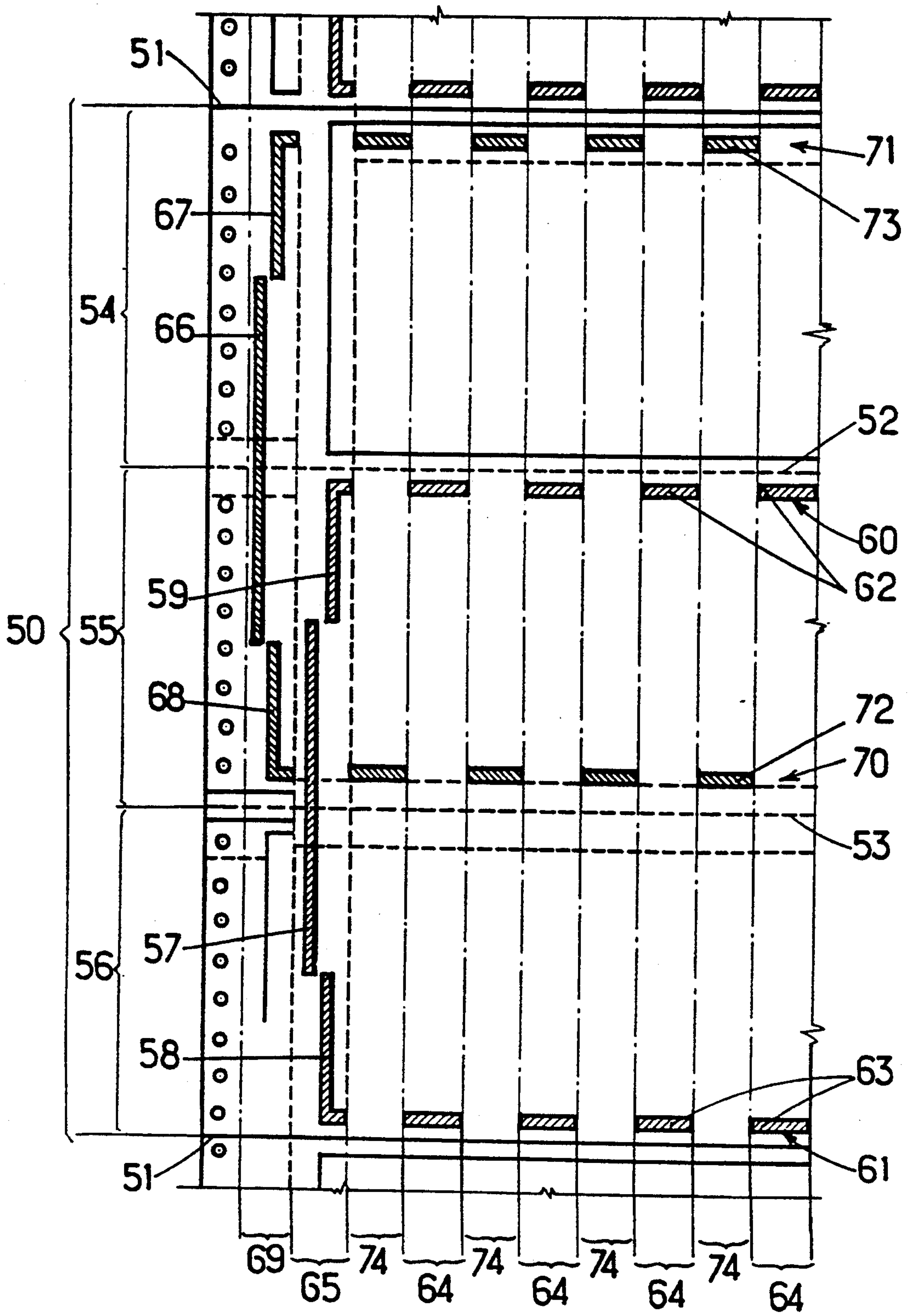

FIG. 5 shows a length of a Z-folding envelopes and parts of adjacent lengths in a web that may be stored in packets in zigzag configuration, rather than in a roll. On the front web surface, where the areas of adhesive are identifiable in the figure by hatching descending to the left, the envelope length 50 has a first line of adhesive 57, which extends, along the edge, from the middle of the height of the posterior part 56 to as far as the middle of the height of the central part 55. Two second lines of adhesive 58, 59, each extend over the remaining halves of the posterior part 56 and central part 55, and are slightly offset in a transverse direction with respect to the line of adhesive 57.

The envelope length 50 further has, in the central part 55 and posterior part 56, two transverse lines of adhesive 60, 61, situated respectively along the fold line 52 and cutting line 51 respectively. These transverse lines 60, 61 are constituted by a series of spots of adhesive 62, 63 the spacing of which is equal to their transverse extension. The spots 62, 63 of the two transverse lines are located in the same longitudinal zones 64. Another longitudinal zone 65 includes the longitudinal lines of adhesive 57 to 59.

If the web is folded about a cutting line 51 so that the two front contacting surfaces of two successive envelope lengths 50 come into contact (folding in zigzag configuration), the areas of adhesive of one front surface of envelope length will not be superimposed on the adhesives of the front surface of the following envelope length. However, by folding the envelope length about the fold line 53, the areas of adhesive on the front surfaces of the central and posterior parts 56 and 55 are brought into contact and can be sealed to form a closed envelope assembly.

The back surface of the web shown in FIG. 5 has, for each envelope length 50, areas of adhesive indicated by hatching descending to the right. The design of these back adhesive areas is similar to those on the front surface, with a few differences including that the longitudinal lines of adhesive 66, 67, 68 are contained in a longitudinal zone 69 which is offset transversely to zone 65.

In addition, the line of adhesive 66 extends from the middle of the length of the anterior part 54 to the middle of the central part 55. The other two adhesive lines 67, 68 respectively extend the remaining lengths of the anterior and central parts 54, 55 of the envelope length. The transverse lines of adhesive 70, 71 are constituted by spots of adhesive 72, 73 which are situated in the anterior and central parts 54 and 55, along the cutting line 51 and fold line 53, and in longitudinal zones 74 separate from zone 64.

Identical individual envelope lengths 50 are limited by two transverse cutting lines 51. They comprise two transverse fold lines 52, 53, which divide them into three successive anterior, central and posterior parts 54, 55, 56 each of substantially the same height. In a manner similar to that described for the front web surface, a fold along a cutting line 51 brings together the rear surfaces of two successive envelope lengths, but does not place their adhesive areas in contact. A fold along the fold line 52 that brings into contact the adhesive on the back surfaces of the envelope areas 54 and 55 to seal the envelope assembly. Furthermore, as the longitudinal zones 64, 65 which contain adhesive on the front surface are separate from the zones 69, 74 which contain adhesive on the back surface. The web can be rolled for storage without bringing adhesives into undesirable contact.

Many adhesives are capable of sealing Z-folding envelopes, but adhere to one another when web storage is prolonged or exposed to heat. In the example described here, heat-sensitive adhesives may be used, but the invention is independent of the nature of the adhesive. A few preferred embodiments of the invention are described here. The invention is not limited to these embodiments. The invention covers that which is encompassed by the terms and spirit of the appended claims.

What is claimed is:

1. A web of envelope lengths having front and back surfaces, said web being segregated by cutting lines into individual envelope lengths, each of said envelope lengths comprising:

a front longitudinal column on the front surface and a back longitudinal column on the back surface, said front longitudinal column being transversely offset from said back longitudinal column, said front and back longitudinal columns each having adhesive coatings confined to said columns; and at least one front row and one back row extending transversely across said front and back surfaces respectively, said front and back rows each having adhesive spots spaced apart from one another in said row, and said adhesive spots on said front row confined to at least one first longitudinal zone of the web, and said adhesive spots on said back row on the back surface are confined to at least one second longitudinal zone of the web, said first longitudinal zone being transversely separated from said second longitudinal zone, wherein said adhesive spots adhere substantially only to other of said adhesive spots, wherein said adhesive spots are offset inwardly from said longitudinal columns.

2. A web of envelope lengths as in claim 1 wherein the areas of adhesive provided on each surface of a first envelope length is offset transversely to facing areas of adhesive on an adjacent envelope length in said web when said web is folded along said cutting lines in a zigzag arrangement into a packet.

3. A web of envelope lengths as in claim 1 wherein said front row adhesive spots are uniformly shaped.

4. A web of envelope lengths as in claim 3 wherein said back row adhesive spots are uniformly shaped.

5. A web of envelope lengths as in claim 1 wherein said front row adhesive spots are elongated transversely.

6. A web of envelope lengths as in claims 1 or 5 wherein said back row adhesive spots are elongated longitudinally.

7. A web of envelope lengths as in claim 1 wherein said web has a center flanked by edges and said front row adhesive spots are wide at said center and narrow near said edges.

8. A web having front and back surfaces of Z-folding envelope lengths, each envelope length segmented into anterior, central and posterior panels, and each panel being separated by a transverse fold line, wherein said envelope lengths each comprise:

a first front longitudinal adhesion segment on said front surface extending across a first front portion of the anterior panel and a first front portion of the central panel;

second front longitudinal adhesion segments on said front surface and being offset transversely with respect to the first front longitudinal adhesion segment and extending over a second front portion of the anterior panel and a second front portion of the central panel, and said second front longitudinal adhesion segments being longitudinally and transversely offset from said first front longitudinal adhesion segments, and a first back longitudinal adhesion segment on said back surface extending across a first back portion of the posterior panel and a first back portion of the central panel;

second back longitudinal adhesion segments on said back surface and being offset transversely with respect to the first back longitudinal adhesion segment and extending over a second back portion of the anterior panel and a second back portion of the central panel, and said second back longitudinal adhesion segments being longitudinally and transversely offset from said first back longitudinal adhesion segments, and wherein said first and second back adhesion segments being contained in a back longitudinal zone transversely offset from a front longitudinal zone containing said first and second front adhesion segments, wherein said first and second back adhesion segments adhere substantially only to other said adhesion segments.

9. A web as in claim 8 further comprising at least one front row and one back row extending transversely across said front and back surfaces respectively, said front and back rows each having adhesive spots spaced apart from one another in said row, and said areas of front row adhesive spots on said front row confined to at least one first longitudinal zone of the web, and said areas of back row adhesive on the back surface are contained in at least one second longitudinal zone of the web, said first longitudinal zone being transversely separated from said second longitudinal zone, and said first and second longitudinal zones being offset from a centerline of said envelope lengths.

* * * * *

UNITED STATES PATENT AND TRADEMARK OFFICE

CERTIFICATE OF CORRECTION

PATENT NO. : 5,409,752
DATED : April 25, 1995
INVENTOR(S) : Olivier D. Juteau

It is certified that error appears in the above-indentified patent and that said Letters Patent is hereby corrected as shown below:

On the Title Page, the name of the assignee (item [73]) is misisng. It should read:

--[73] Assignee: Moore Business Forms, Inc.--

Signed and Sealed this

Seventeenth Day of October, 1995

Attest:

Bruce Lehman

BRUCE LEHMAN

Attesting Officer

*Commissioner of Patents and Trademarks*